Patented Oct. 12, 1948

2,451,404

UNITED STATES PATENT OFFICE 2,451,404

INDUCTIVE ELECTRICAL INDICATOR WITH COMPENSATED DAMPER

Horace M. Norman, Skokie, Ill., assignor to Stewart-Warner Corporation, Chicago, Ill., a corporation of Virginia Application August 20, 1943, Serial No. 499,329

4 Claims. (Cl. 171—95)

This invention relates to electrical indicators, and particularly to the indicating unit of an electric speedometer or tachometer.

The primary object of the invention is to provide a new and improved arrangement for damping the movement of an indicator needle to prevent undesirable movement thereof by sudden changes in speed, vibrations or movements of the vehicle or other structure on which it may be mounted.

In my Patent No. 2,339,743, granted January 18, 1944, there is disclosed an electric speedometer wherein the indicating unit comprises a stator having polyphase windings supplied with alternating current and adapted to set up a revolving magnetic field and to move a pointer actuating rotor against a resilient mechanical resistance (a hair spring), thereby to control the position of the pointer in response to the speed to be indicated. In certain applications it has been found that when the indicating unit is shaken or when the speed changes suddenly, the pointer swings unduly for a brief period of time.

It is an object of the present invention to provide a new and improved speed indicating unit having means for electromagnetically damping the movement of the pointer so as to prevent undesirable swinging movement thereof and to stabilize the positional indication of the pointer.

Another object of the present invention is to provide an apparatus of the character aforesaid wherein the electromagnetic damping is provided by a stationary magnetic field superimposed on the revolving field produced by the stator.

A further object of the present invention is to provide a new and improved speed indicating unit having electromagnetic damping means constructed and arranged not to interfere with the operation of the unit and not to cause errors in readings irrespective of variations in voltage of the source supplying energy to the damping means or in the length of time the unit has been in use.

Figure 1:
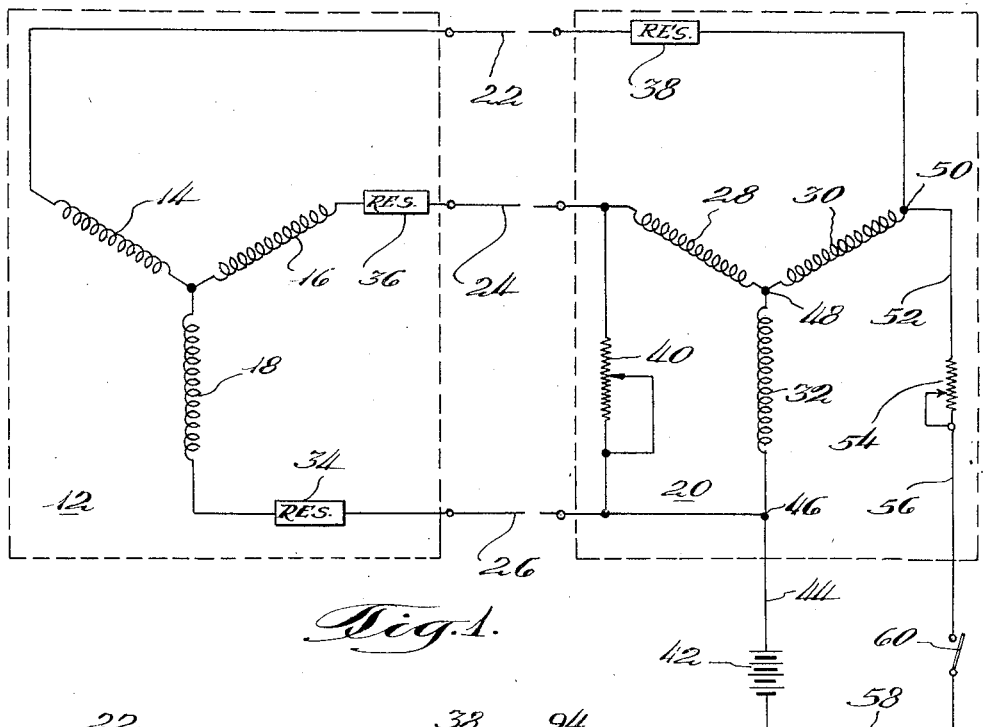
Figure 2:
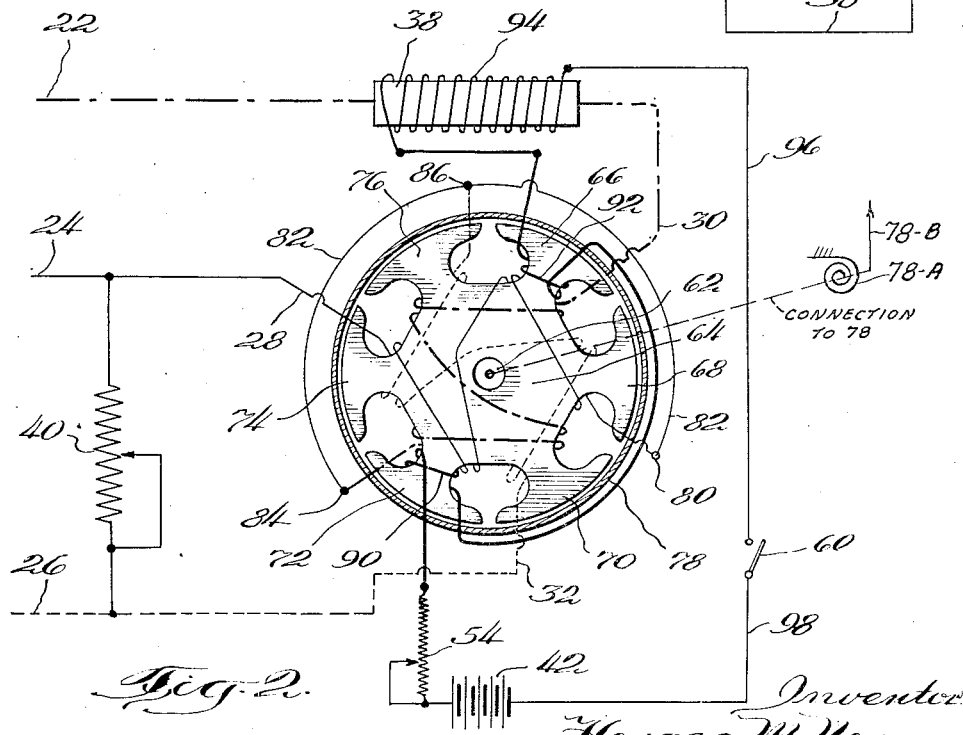

Other objects and advantages of the invention will become apparent during the following description, reference being had therein to the accompanying drawing, in which Fig. 1 is a schematic representation of one embodiment of a speed indicating unit constructed in accordance with my invention in an electric speed indicator, including also a sending or generating unit adapted to supply the indicating unit with a polyphase alternating current; and Fig. 2 is a schematic representation of another, and preferred, embodiment of the speed indicating unit.

As shown diagrammatically in Fig. 1, and as described with particularity in my earlier application referred to above, the sending unit, indicated generally at 12, is a polyphase, preferably a three-phase, alternating current generator comprising star-connected fixed armature windings 14, 16, and 18. These windings may have associated therewith a permanent magnet rotor (not shown), rotated by suitable means at a speed bearing a constant relationship with the speed of the vehicle, assuming the apparatus is intended to indicate the speed of a vehicle. The apparatus may, of course, be used to indicate the speed of rotation of a part of a vehicle or of any rotating element and the term speed indicating unit or device is intended to be of a scope to cover indication of speeds broadly. The rotor and stator are so constructed and arranged that rotation of the rotor induces a three phase alternating current in the armature windings and this current is supplied to the indicator unit, shown generally at 20, through three inter-unit conductors 22, 24 and 26.

The indicator unit 20 comprises three star connected fixed armature windings 28, 30 and 32 which, when supplied with alternating current, produce a revolving magnetic field, in a manner well known to those skilled in the art. The revolving magnetic field effects rotation of a non-magnetic induction rotor or speed cup, which may be made of aluminum and is indicated by reference character 78 in Fig. 2, against the opposing torque of a hair spring 78—A. The torque exerted upon the speed cup is dependent upon the magnitude and frequency of the alternating current generated by the sending unit, and since both these characteristics are dependent upon the speed of rotation of the rotor at the sending unit, the rotor of the indicating unit assumes a position dependent upon the speed of the vehicle. An indicator needle 78—B is mechanically connected to the induction rotor so that it also assumes a position dependent upon the speed of the vehicle.

Compensation for the effect of temperature variations is provided by resistors 34, 36 and 38 having negative temperature coefficients of resistance, as described in my previously referred to copending applications. These resistors are located in the interconnecting circuits and the resistor 38 is located at the indicating unit location and the others at the sending unit location. The resistors may be made of carbon or carbon compounds and be of several types now available on the market. In addition, a positive temperature coefficient resistor 40, connected across conductors 24 and 26, may be provided to adjust the ratio of the reactance to the resistance of the system in the calibration of the apparatus.

One of the primary features of the present invention pertains to the provision of electromagnetic damping means for preventing undesired movements of the indicator needle due to vibration of the vehicle and the like. In the embodiment of Fig. 1, the damping is effected by superimposing a stationary magnetic field upon the revolving field acting upon the speed cup or induction rotor. This field is obtained by passing direct current obtained from a battery 42 through the indicator unit stator windings 30 and 32. The energizing circuit includes conductor 44, terminal 46, winding 32, junction 48, winding 30, terminal 50, adjustable resistor 54, and conductors 56 and 58. A switch 60, which is closed only when the vehicle is operating and which may be the ignition switch, is connected between conductors 56 and 58. The resistor 54 enables the current flow and damping to be adjusted readily.

The current flowing through windings 30 and 32 of the stationary armature provides a stationary magnetic field which induces eddy currents in the speed cup upon movement of the speed cup and thereby tends to restrain movement thereof. Thus, the restraint of movement of the speed cup tends to prevent undesired swinging movements of the indicating needle.

In Fig. 2 there is illustrated another embodiment of the present invention which includes, in addition, means for preventing the damping means from affecting the readings of the device, so that the readings will not be affected by variations in voltage of the battery 42 or by the length of time the device is in operation. In this embodiment a separate stationary field producing winding is utilized and it has associated with it heating means for varying the resistance of resistor 38, thereby to compensate for the effect of current flow through the damping winding. Fig. 2 also illustrates in somewhat greater detail the construction of the indicating unit.

The stationary armature upon which the windings 28, 30 and 32 are supported is mounted on a fixed shaft 62. The armature is preferably made of laminations, each having a central supporting portion 64 and a plurality of substantially T-shaped radially extending teeth integral therewith. In the illustrated embodiment the armature has six teeth numbered consecutively, reading clockwise, 66, 68, 70, 72, 74 and 76. A rotatable annular speed cup 78 (which is generally cup-shaped) circumferentially surrounds the six armature teeth from which it is slightly spaced. The three windings 28, 30 and 32 are diagrammatically shown as they may be wound relative to the armature teeth and in order that their locations may be more readily ascertained they have been drawn in a distinctive manner. The winding 28 (as shown in full line) forms a coil embracing the two teeth 72 and 74 and then extends across the armature to form a coil embracing the opposite two teeth 66 and 68, whence it connects at 80 to a conductor 82 which is common to the three windings, and which corresponds to the junction 48 shown diagrammatically in Fig. 1. Winding 30 (shown by a dot-dash line) first forms a coil, embracing teeth 76 and 68, and then extends across the armature to form a coil embracing the two opposite teeth 70 and 72, whence it leads to terminal 84, connected to the conductor 82. Winding 32 (shown by a dash line) first embraces the two teeth 68 and 70 and then extends across the armature to embrace the opposite two teeth 74 and 76, whence it leads to terminal 86 connected to the conductor 82. As explained in the description of the embodiment of Fig. 1, the alternating current flows through the windings 28, 30 and 32, sets up a revolving magnetic field tending to rotate speed cup 78 against the torque of a hair spring (not shown) to positions dependent upon the speed of the vehicle.

The stationary magnetic field utilized for damping is produced by a pair of coils 90 and 92 wound about opposed armature teeth 72 and 66, respectively, and preferably before the main armature windings are wound in place, to give the same polarity. The result is the creation of a four pole stationary magnetic field that tends to restrain movements of the speed cup 78 by inducing eddy currents therein. The energizing circuit for the coils includes the battery 42, adjustable resistor 54, a heater coil 94 encircling the resistor 38 (for a purpose to be described shortly), conductor 96, the switch 60 and conductor 98.

The use of a separate circuit for the production of the stationary magnetic field prevents the circuit from affecting the normal or intended movement of the speed cup. Substantially the only effect thereon is that caused by the heating of the armature windings 28, 30 and 32 by the coils 90 and 92, and this is compensated for by the heater coil 94 located in heat transfer relationship to the negative temperature coefficient resistor 38. The heater is arranged to decrease the resistance of resistor 38 by approximately the same amount that the resistance of the stator or armature windings is increased due to the heat generated by coils 90 and 92. If the compensation were not provided, the effect of heating coils 90 and 92 (and the direct current flow through windings 30 and 32 in Fig. 1) would be to raise the temperature of the armature windings and thereby decrease the current flow therethrough because of the increased resistance. However, the compensation provided in the embodiment of Fig. 2 renders the deflections of the needle substantially independent of variations in voltage of battery 42 and of the length of time the device is used. While it is not necessary, it is preferred that the coils 90 and 92 be wound about the armature teeth 72 and 66 about which the armature winding 30 in series with resistor 38 is also wound.

Although I have illustrated and described certain specific embodiments of my invention, it will be apparent that numerous modifications might be made without departing from the scope of said invention. For instance, systems employing currents other than three phase alternating current could be utilized with the electromagnetic damping and compensation. Compensation for the heating effect of the direct current flowing through coils 28 and 30 of the embodiment of Fig. 1 could also be utilized. It is therefore my intention that such scope be limited only by the terms of the appended claims.

I claim:

1. An electrically operated indicating unit for a speedometer or the like of the type comprising an induction rotor and revolving magnetic field producing means for moving said rotor, including in combination, a source of electrical energy, means energizable from said source for producing a stationary magnetic field acting upon said rotor to damp said rotor, and means associated with said revolving field producing means providing compensation for the heating of said revolving field producing means by the energy flowing through said stationary magnetic field producing means.

2. An electrically operated indicating unit for a speedometer or the like of the type comprising a stationary armature having a polyphase winding adapted to create a revolving magnetic field, an induction rotor movable by the revolving magnetic field and a negative temperature coefficient resistor connected in series with one phase of said winding, including in combination, a direct current circuit including a winding on the armature for creating a stationary magnetic field to damp movements of the induction rotor, said direct current circuit including also heat producing means in heat transfer relationship with said negative temperature coefficient resistor to compensate for changes in the resistance of the first-mentioned winding due to heating effect of the second-mentioned winding.

3. An electrically operated indicating unit for a speedometer or the like of the type comprising an induction rotor, an armature core in fixed position closely adjacent to said rotor, windings on said core adapted when energized by alternating current to produce a revolving magnetic field for moving said rotor, including in combination, a source of direct current and a second winding energizable from said source for producing a stationary magnetic field adapted to damp movements of said rotor, and current regulating means in circuit with said first named windings controlled by the direct current flowing through said second winding for regulating the flow of current to said first named windings whereby the heating effect of said direct current on said armature is compensated for.

4. An electrically operated indicating unit for a speedometer or the like of the type comprising an induction rotor, an armature core in fixed position closely adjacent to said rotor, windings on said core adapted when energized by alternating current to produce a revolving magnetic field for moving said rotor including in combination, a source of direct current and a second winding energizable from said source for producing a stationary magnetic field adapted to damp movements of said rotor, current regulating means in circuit with said first named windings controlled by the direct current to said second winding for regulating the flow of current to said first named windings whereby the heating effect of said direct current on said armature is compensated for, and variable resistance means for controlling the passage of direct current through said second winding.

HORACE M. NORMAN.

REFERENCES CITED

The following references are of record in the file of this patent:

UNITED STATES PATENTS

| Number | Name | Date |
|---|---|---|
| 1,055,911 | Hopkins | Mar. 11, 1913 |
| 1,667,624 | Corson et al. | Apr. 24, 1928 |
| 1,732,726 | Lenehan | Oct. 22, 1929 |
| 1,907,343 | Carpenter | May 2, 1933 |
| 1,962,929 | Faus | June 12, 1934 |
| 2,159,330 | Kelly | May 23, 1939 |
| 2,175,890 | Glowatzi | Oct. 10, 1939 |
| 2,188,570 | Farr et al. | Jan. 30, 1940 |
| 2,196,402 | Snyder | Apr. 9, 1940 |